H. KLECKLER.
FUSELAGE CLIP.
APPLICATION FILED MAY 14, 1917.

1,298,515.

Patented Mar. 25, 1919.

Inventor
HENRY KLECKLER

By John P. Tarbox
Attorney

UNITED STATES PATENT OFFICE.

HENRY KLECKLER, OF BUFFALO, NEW YORK, ASSIGNOR TO CURTISS AEROPLANE AND MOTOR CORPORATION, A CORPORATION OF NEW YORK.

FUSELAGE-CLIP.

1,298,515. Specification of Letters Patent. Patented Mar. 25, 1919.

Original application filed January 13, 1916, Serial No. 71.892. Divided and this application filed May 14, 1917. Serial No. 168,585.

*To all whom it may concern:*

Be it known that I, HENRY KLECKLER, a citizen of the United States, residing at Buffalo, in the county of Erie and State of New York, have invented certain new and useful Improvements in Fuselage-Clips, of which the following is a specification.

My invention relates to aeroplane fittings and more particularly to fittings having integral parts which accommodate elements of the fuselage and wing structure other than the particular parts which said fittings embrace. The nature of the invention is specifically outlined in a copending application, Serial No. 71,892, filed January 13, 1916, of which this application is a division. As therein pointed out, the fittings are of substantially U-form and embrace the longerons of the fuselage in the vicinity of the engine section thereof, preferably at the foot of the fuselage struts which continue the wing posts into the fuselage as an intimate part thereof. These fittings overlap said struts to serve as strut fastening-devices and are provided with sockets and hinge ears respectively, the sockets accommodating brace elements of the fuselage and the ears the hinge pins of the wing hinge parts. Moreover, said fittings are equipped with arms or extensions which provide appropriate anchorages for the fuselage and wing structure wiring.

Figure 1:
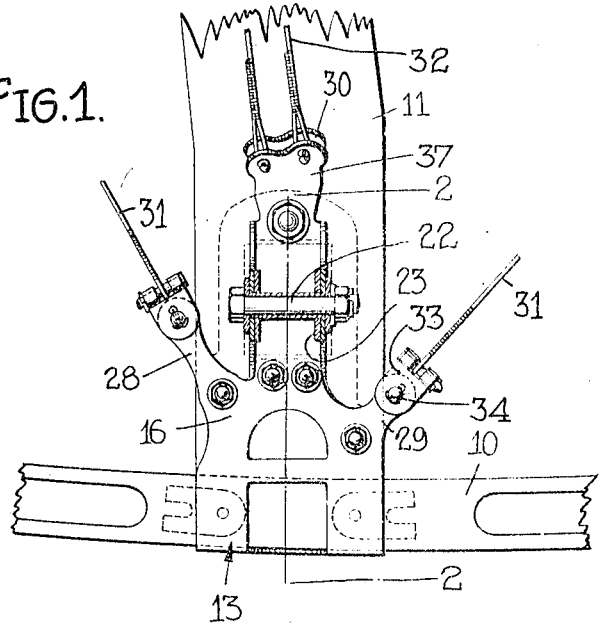
Figure 2:
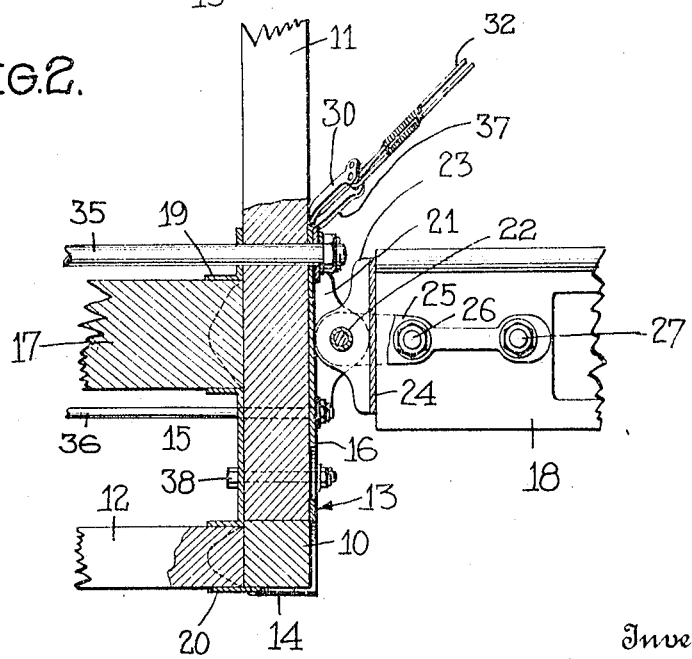

Of the drawings, wherein the selected embodiment of the invention is disclosed:

Figure 1 is a side elevation, partly in section, of the fitting of this invention, and Fig. 2 is a section on the line 2—2 of Fig. 1.

The longerons (lower) of the fuselage, I have designated as 10. The fuselage struts or wing posts I have designated as 11. These struts interconnect the upper and lower longerons at the engine section of the fuselage and are extra heavy for increased strength at said section. Said struts continue the wing posts into the fuselage as an intimate part thereof. Horizontal fuselage struts 12 interconnect the lower longerons 10. The upper longerons (not shown) are similarly connected.

The aeroplane fitting, or more properly fuselage fitting, comprehended by this invention, is designated in its entirety by the numeral 13. It is constructed of sheet metal, preferably stamped and afterward bent into U-form as shown. The bight portion of the fitting is designated 14 and the extensions thereof as 15 and 16 respectively. These extensions 15 and 16 are of substantially the same width as the strut 11 at the foot of which the fitting 13 is placed. The bight portion of the fitting underlies the longeron 10 so that the fitting in its entirety may function as a fastening means for the strut 11.

In addition to the horizontal strut 12 the engine section of the fuselage is transversely braced by means of compression struts 17 arranged to interconnect the vertical struts 11 in the plane of the lower wings and in alinement, preferably, with the wing beams. Socket ears 19 and 20 are formed upon the the extension 15 of the fittings 13 to accommodate the struts 17 and the struts 12 of the engine section. These ears 19 and 20 are struck out from the fittings of which they form a part, the ears 20, or rather certain of said ears, lying in the plane of the bight portions of the fittings, preferably as continuations thereof. The position of and the shape of the ears, however, is immaterial from the standpoint of invention.

Said fittings 13 are further provided with socket ears 21 (in pairs), integral with the extensions 16 and in line preferably with the compression struts 17 to receive the hinge pins 22 of the wing hinges. The hinges, in addition to the pins 22 comprise hinge ears 23 which engage between the ears 21 of the fitting, and compression plates 24 which abut or lie flush up against the inner extremities of the wing beams. By this connection the dihedral angle of the wings may be varied and the wing bodily detached. Bracing plates 25 are exteriorly anchored upon the hinge pins 22 in pairs and are secured to the wing beams (see Fig. 2) by through bolts 26. Moreover, these plates 25 are continued along the beams (one of which is designated 18) for a second point of connection therethrough by bolts 27.

A sleeve 22', integral with the ears 21

(Fig. 1), is arranged to penetrate the ears 23 of the compression member 24. In this way the strength of the hinge is increased and the shearing tendency eliminated. To remove and detach the wings the bolts 26 and 27 are withdrawn rather than the hinge pin 22.

In addition to the sockets 19 and 20 and the hinge ears 21, the fitting 13 is equipped or provided with arms or extensions 28, 29 and 30, the former extensions 28 and 29, being formed integrally upon the extension 16, one upon each edge thereof, and the latter, extension 30, as a continuation thereof. The extensions 28 and 29 lie in the plane of the fitting extension 16. Extension 30, however, extends at an angle. Said extensions each serve as an anchorage for the customary wiring. The extensions 28 and 29 anchor the fuselage wiring 31 and the extension 30 the wing structure wiring 32. Tabs or ears 33, bent upon themselves for the loose accommodation of pintles 34, are utilized as the fastening means for the wiring 31.

To, in effect, interconnect the wings at opposite sides of the fuselage, tension rods 35 and 36 are employed. The rods 35 penetrate both extensions of the opposed fittings 13 at a point adjacent their extremities and in addition penetrate a second ear 37 to serve as its fastening means. The rods 36 penetrate both extensions of the opposed fittings and the rods collectively function as fitting fastening means. Bolts 38 provide additional fastening means. The ear 37 is only to be used when duplex wiring is provided.

For decreased weight without a corresponding decrease in strength the fittings 13 may be lightened considerably by the formation of lightening holes therein as shown. Said fittings are to be stationed at the foot of each fuselage strut 11 and are to be so constructed as to accommodate, by the integral formation of ears and sockets, the wing hinge parts and the fuselage parts which are situated in the immediate vicinity thereof. Furthermore, the fittings not only fasten the longerons 10 to the struts 11 but by reason of their U-form do this in the best possible way when it is considered that the longerons are securely fastened without necessitating their penetration by fastening bolts.

Although I have described more or less precise forms and details of construction, I do not intend to be understood as limiting myself thereto as I contemplate changes in form, the proportion of parts and the substitution of equivalents as circumstances may suggest or render expedient and without departing from the spirit of the invention as claimed.

What is claimed is:

1. In an aeroplane, the combination with a longeron, of a U-fitting embracing the longeron, and ears struck out from one side of the fitting to provide hinges integral therewith.

2. In an aeroplane, the combination with a longeron, of a U-fitting embracing the longeron, and ears struck out from the sides of the fitting to form integral hinge supports and brace sockets.

3. In an aeroplane, a fuselage including posts, fittings embracing each post, means bracing the posts, sockets formed on the fittings to accommodate said bracing means, and hinge ears also formed on the fittings in alinement with one of said bracing means.

4. In an aeroplane, fuselage posts, a fitting embracing each post, a socket formed on each fitting, a beam receivable in opposite fittings of sockets to brace the posts, and hinge ears formed upon said fitting in continuation of said beam upon the opposite side of each post.

5. In an aeroplane, the combination with a fuselage post and a wing beam, of a fitting carried by said post, ears formed on said fitting, means hingedly connected to said ears and connected to said beam, and a socket formed upon said fitting oppositely to said ears.

6. In an aeroplane, the combination with a longeron and a post erected thereon, of a fitting embracing both post and longeron, a socket formed upon said fitting at right angles to said post and longeron respectively, bracing means receivable in said socket, and hinge ears also formed upon said fitting in alinement with the brace socket.

7. In an aeroplane, a fuselage including longerons, fuselage posts, fuselage fittings which embrace the longerons and overlap the opposite faces of the fuselage posts, each fitting being provided with hinge ears upon its outer face and socket ears upon its inner face, and a compression member seated in the opposed socket ears to cross brace the fuselage in the plane of the hinge ears formed upon said fittings.

8. In an aeroplane, longerons, posts erected thereon, compression means interbracing corresponding posts, tension means interconnecting said posts, fittings fastened to said posts, and wing-hinge parts formed upon said fittings in proximity to both said compression and said tension means.

9. In an aeroplane, a fuselage, a wing beam, a wing hinge for fastening said beam to said fuselage, a fuselage compression brace in alinement with the wing beam, and tension rods for the fuselage arranged in substantial parallelism with the fuselage compression brace and likewise in substantial alinement with the wing beam.

10. In an aeroplane, a fuselage including longerons and a fuselage post, opposed wing beams, fuselage fittings, each fitting being provided with hinge ears upon its outer face for the attachment of the wing beams, a fuselage compression brace arranged between said fittings in alinement with the wing beams, the ends of the compression brace being seated in sockets formed upon said fittings, and tension means likewise alined with the wing beams, said tension means being also in engagement with said fittings.

In testimony whereof I hereunto affix my signature.

HENRY KLECKLER.

Copies of this patent may be obtained for five cents each, by addressing the "Commissioner of Patents, Washington, D. C."